UNITED STATES PATENT OFFICE.

JOHANNES PFLEGER, OF FRANKFORT-ON-THE-MAIN, GERMANY.

PROCESS OF EXTRACTING ZINC BY ELECTROLYSIS.

SPECIFICATION forming part of Letters Patent No. 495,637, dated April 18, 1893.

Application filed August 24, 1892. Serial No. 443,972. (No specimens.)

*To all whom it may concern:*

Be it known that I, JOHANNES PFLEGER, a subject of the Emperor of Germany, and a resident of Frankfort-on-the-Main, Germany, have invented new and useful Improvements in the Electrolytical Extraction of Zinc, of which the following is a specification.

In the processes heretofore used of extracting zinc out of a solution, or zinc out of alloys, or other material containing zinc, all have the drawback that the zinc is easily deposited on the cathode in a spongy form, and thus the whole process is doubtful, as it has as yet not been possible to melt spongy zinc, and thus put it into a form in which it may be utilized. The causes of this spongy formation are the foreign metals mixed with the solution or brought into it during the process of electrolysis, for which reason it has always been the endeavor to get rid of these metals in the solution or electrolytes. This has hitherto been tried by precipitating these foreign metals by means of zinc-dust. But the continuous supplying with zinc-dust necessitated quite a complicated and difficult procedure during the electrolysis. The process which is the subject of this invention obviates this difficulty, as it cleanses the solution by a very simple process, respectively preventing any foreign metals from getting into the electrolytes. The process is based upon observations made by the inventor that these foreign metals and their oxides are insoluble in a basic zinc salt solution and can be precipitated by it out of their solutions.

It is a fact that a concentrated zinc salt solution can dissolve a greater or less quantity of oxide of zinc, according to the strength of the concentrated solution, and the degree of heat employed. In this manner, basic zinc salts are obtained of various compositions, as for example the following:

(a) $Zn.Cl_2 + 3Zn.O = Zn.Cl_2, 3Zn.O.$ (See Gmelin, Krauth *Handbuch der Chemie*, 1875, III, p. 31.) This basic salt, $Zn.Cl_2 3Zn.O$ is soluble in hot concentrated solution of chloride of zinc; or (b) $Zn.S.O_4 + 4Zn.O = Zn.S.O_4, 4Zn,O.$ (See Gmelin, Krauth, p. 22.) This is soluble in hot concentrated solution of sulphate of zinc.

That the foregoing compositions are basic salts is proved by adding water, when all basic salts are decomposed again into neutral salt and metallic oxide. If such a basic solution of zinc salt is used as an electrolyte for zinc, it precipitates out all dissolved impurities, such as copper, as basic salts or as oxides. On the other hand it prevents the impurities contained in a soluble anode from being dissolved, as for instance:

(a) $Zn.Cl_2, 3Zn.O. + 4Cu,Cl_2 = 4Zn.Cl_2 + Cu.Cl_2, 3Cu.O;$ or (b) $Zn.S.O_4, 4ZnO + 5Cu.S.O_4 = 5Zn.S.O_4 + Cu.S.O_4, 4Cu.O.$

The basic copper salts thus obtained, viz: $Cu,Cl_2.3Cu.O;$ or $Cu,S.O_4, 4Cu.O,$ are insoluble in the zinc salt solution, and consequently are rendered innoxious. The zinc salt solution is purified, or, in case of soluble anodes, protected against impurities, and thus the conditions under which solid metallic zinc is obtained are fulfilled.

If zinc is to be obtained out of a solution which is neutral, the above described liquid is added with a very small surplus before the electrolysis; if the solution to be electrolyzed is acid, the added basic zinc salt solution must contain suspended a surplus of oxide of zinc. After adding the basic solution, the least particles of foreign metals are precipitated and a clear solution is obtained out of which the zinc may be obtained as compact metal by electrolysis.

That foreign metals can be precipitated by oxide of zinc is well known, but in order to get rid of the least particle of these impurities a large surplus of oxide of zinc is necessary, while if using a basic salt solution, this getting rid of the foreign metals can be accomplished without any great surplus of the precipitating agent.

Of much more importance than obtaining zinc out of solutions, is the extraction of pure zinc out of zinc-ore, hard zinc, zinc-alloys, in fact all zinc-containing electrodes. In order to prevent the forming of spongy zinc or the solution of foreign metals out of the anode, during the electrolysis, the above described clear alkaline acting solution is used as electrolyte. This solution, to which preferably a good conducting neutral salt, as for instance, chloride of sodium, chloride of magnesium, sulphate of potash, has been added, is allowed to circulate in a constant stream through the electrolytic baths.

According to the nature of the electrode, i. e., according to whether the anode contains much or little zinc which is to be dissolved, the electrolyte will retain or diminish its contents of basic salt. In the first case no further operation is necessary, but in the latter it is necessary to provide a continuous or intermittent inflow of new zinc oxide, in order that the electrolyte may retain its alkaline action.

Having now described my invention, what I claim, and desire to secure by Letters Patent, is—

1. The process herein described of treating impure zinc solutions before electrolysis, which process consists in adding thereto a solution of a basic-zinc-salt, as specified.

2. The process of obtaining zinc by electrolysis out of a zinc-containing anode which consists in adding to the bath a basic-zinc-salt solution adapted to act as electrolyte, to which basic zinc-salt solution a conducting neutral salt has been added, as set forth.

In testimony whereof I have signed my name to this specification in the presence of two subscribing witnesses.

JOHANNES PFLEGER.

Witnesses:
FRANZ HASSLACHER,
FRIEDRICH QUEHL.